Patented Feb. 20, 1951

2,542,286

UNITED STATES PATENT OFFICE 2,542,286

LUBRICATING OIL CONTAINING CHLORINATED CYCLIC POLYMER

Rupert C. Morris, Berkeley, and John L. Van Winkle, San Lorenzo, Calif., and Alva V. Snider, Hempstead, N. Y., assignors to Shell Development Company, San Francisco, Calif., a corporation of Delaware No Drawing. Original application September 26, 1944, Serial No. 555,892. Divided and this application January 6, 1948, Serial No. 810

5 Claims. (Cl. 252—58)

This invention relates to organic compositions which have been improved in one or more respects by the incorporation of certain polymeric additives. In one of its preferred embodiments the invention may be exemplified by improved compounded lubricants, such as refined petroleum or mineral oil compositions, which contain the herein-described halogenated hydrocarbon polymers.

One object of the invention is to produce lubricating compositions containing diolefin polymers of regulated molecular weight, which polymers contain chemicaly combined halagen in a stable and beneficial form. Another purpose is to provide new petroleum-base compounded oils and greases effective under conditions of extreme pressure and/or possessing improved viscosity indices and/or other beneficial properties. A further object is to produce organic compositions having improved anti-oxidant or anti-corrosive properties. Additional objects will be apparent from the following description and claims.

It has been suggested that saturated or substantially saturated high molecular weight organic polymers may be added to lubricating oil. Such compounds have been produced, for example, by condensation of mono-olefins so that the final polymer is also a mono-olefin—that is, there is but one double bond in the total polymer, which polymer may have a molecular weight of thousands.

If attempts are made to introduce chlorine in such compounds it may proceed along any or all of three lines. These are: (1) addition to the lone olefinic bond, which procedure by itself obviously produces a compound of minute chlorine content; (2) substitution of chlorine; since such substitution is never attained uniformly throughout the molecule, the product obtained is thus as a rule not very satisfactory and may also be unstable, giving off HCl under lubricating conditions, as when exposed to relatively high temperatures; (3) introducing chlorine into such polymers by reaction at conditions that will cause depolymerization or scission of the polymer molecule; this likewise results in non-uniform chlorination as well as production of a mixture of polymers and by-products of widely varying molecular weights and properties.

It has now been found, however, that alkyl-substituted 1,3-pentadienes, such as 2-methyl-1,3-pentadiene, 3-methyl-1,3-pentadiene, 4-methyl-1,3-pentadiene, 2-ethyl-1,3-pentadiene, 3-ethyl-1,3-pentadiene, 4-ethyl-1,3-pentadiene and higher homologues, may be polymerized and subsequently treated to yield a large series of varied substances which have a particular utility as additives for lubricating compositions such as petroleum or refined mineral oil.

It will be seen that the present starting compounds are characterized (in addition to being conjugated diolefins) by the presence of a tertiary carbon atom attached to a double bond. This is very advantageous for the present purposes. Thus, the basic structure

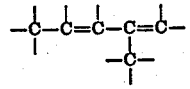

may yield a linear polymer by 1,4 polymerization to give the structure

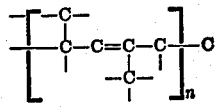

or a 1,2 polymerization to yield

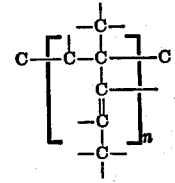

as well as a mixture of these types or it may form a cyclic polymer, according to the conditions of polymerization.

Individual compounds or mixtures of alkyl substituted 1,3-pentadienes (which may contain the same or different alkyl substituents) may be employed as starting material. One convenient starting material, for example, is the mixture obtained from dehydrating 2-methyl-2,4-pentanediol, which mixture is about 85% 2-methyl-1,3-pentadiene and about 15% 4-methyl-1,3-pentadiene. It is also to be understood that the conjugated diolefins may contain other organic or inorganic substituents which do not interfere with the reaction. Thus, for instance, the unattached bonds on the carbon atoms in the foregoing paragraph may be connected to hydrogen atoms, halogen atoms, low molecular weight alkyl radicals, etc.

Depending upon the reaction conditions, the present diolefins may be polymerized either to low molecular weight cyclic polymers or to higher molecular weight linear polymers. To obtain the cyclic polymer, the alkyl substituted 1,3-pentanediene may be reacted with sulfur dioxide to yield a mixture of low molecular weight cyclic polymer and dialkyl sulfolene having the basic structure:

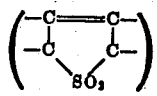

An elevated temperature on the order of 100° C. is employed and the conversion is conveniently effected under elevated pressure as in an autoclave. Peroxides or other oxidation catalysts may be present but generally they are unnecessary. A reaction time of about 0.5 to 1 hour is generally adequate.

About 50% of this polymer formed from conjugated methylpentadienes contains four to six monomeric units, the remainder containing up to about ten units and averaging about six to seven. The sufolene simultaneously formed may be heated at atmospheric pressure and at a minimum temperature of about 86° C. to yield sulfur dioxide and more of this same cyclic polymer by decomposition or cracking of the sulfolene in practically quantitative amount. This result is unique since a corresponding treatment of the sulfolenes obtained from butadiene, isoprene, 2,3-dimethylbutadiene-1,3 and similar compounds results in depolymerization to the monomer and sulfur dioxide.

Cyclic polymers thus formed from low molecular weight alkyl substituted 1,3-pentadienes (i. e., having up to about 10 carbon atoms in the monomer) are liquids. This liquid polymer from methyl 1,3-pentadienes is yellowish-brown in color. It may be stabilized by heating for a few hours at about 200° C.–225° C. This results in a more uniform product, removing the last traces of $SO_2$ and lower polymers. The stabilized product is free of sulfur and, in large part, appears to be formed of approximately 7 to 8 units of methyl pentadiene. Its molecular weight is in the neighborhood of 600 and it boils above 250° C.

High molecular weight linear polymers, on the other hand, may be produced from the present alkyl substituted 1,3-pentadienes by a number of methods. For example, perborates, persulfates, peroxides and similar catalysts are quite effective about 40° C.–60° C. to effect polymerization in aqueous emulsion or such polymerization may be accomplished with a diazoamino aryl catalyst such as diazoaminobenzene at a temperature in the neighborhood of about 90° C.

The present alkyl substituted 1,3-pentadienes may also be polymerized with stannic chloride or other Friedel-Crafts catalysts such as are listed by Calloway in Chem. Rev. 17, 327 (1925). When this polymerization is carried out at a low temperature such as below −50° C., rubber-like, substantially colorless polymers are obtained which are extremely elastic and strong. Friedel-Crafts catalysts give a linear polymer in every case regardless of the temperature. The cyclic polymer is obtained by using $SO_2$ at elevated temperatures. At intermediate temperatures a linear, high molecular weight, non-rubbery polymer is produced. Any of these polymers may be reacted with chlorine according to the present invention.

These alkyl substituted 1,3-pentadienes may also be cross polymerized with (usually minor amounts of) styrene, alpha-methylstyrene, divinylbenzene, piperylene, isoprene, butadiene and other olefins and conjugated diolefins under similar conditions. The designation, alkyl substituted 1,3-pentadiene polymer, as used herein and in the appended claims, is taken to include the copolymers of the alkyl substituted conjugated pentadienes with other polymerizable organic substances as well as homo polymers containing only the alkyl substituted 1,3-pentadienes.

The linear polymers, when of sufficiently high molecular weight, may be added to organic compositions such as lubricating oil to improve the viscosity index. However, both the cyclic and the linear polymers may be chlorinated to yield additives possessing anti-oxidant and/or extreme pressure properties. These chlorinated polymers are excellent "extreme pressure" additives. A particular advantage of such compounds is that halogen is incorporated in the polymers by addition rather than by substitution so that the temperature necessary for such chlorination is below that which causes depolymerization. The reaction time required to produce the present products is likewise correspondingly less. The products are also more stable as well as more oil soluble than the chlorinated polymers known to the art. Again, hydrogen halide which is produced in halogen substitution reactions are substantially absent in the present addition halogenation processes so that the supply of reagent is not dissipated by a production of undesirable by-products.

Most important, as contrasted with the compounds of the prior art, the presence of an olefinic bond in each monomeric unit of the polymer permits the incorporation of a very considerable amount of halogen in the polymer, even, if desired, without the production of a saturated product. Thus, the methylpentadiene unit has a molecular weight of 82. Upon complete saturation, with chlorine, to each of these units would be added one molecule of $$Cl_2 \frac{71}{71+82} = 46.5\% \text{ wt.}$$

A very stable and satisfactory product, however, may usually be made by incorporating only about 10%–20% of chlorine in the polymer.

Although the hydrocarbon polymers having molecular weights up to 500,000 or more are soluble in lubricating oil, this solubility is decreased by the incorporation of considerable amounts of chlorine, so that for polymers above about 20,000 or 30,000 molecular weight the chlorine incorporated therein is preferably on the order of a few percent (e. g. 1%, 2% or up to about 5%). Thus, from the viewpoint of oil-solubility, those chlorination linear polymers having a molecular weight from about 1000 to about 20,000 or 30,000 are more desirable.

Halogenation (such as chlorination) may, in general, be effected by dissolving the polymer in a suitable anhydrous inert solvent such as benzene, ethylene dichloride, dioxane, carbon tetrachloride, chloroform, etc., and reacting with chlorine at temperatures below about 100° C. Above this temperature the chlorine may react by substitution with evolution of HCl.

Chlorine may also be introduced into the polymer simultaneously with such reagents as sulfur monochloride, sulfur dichloride, etc.

Chlorination may also be effected by the addition of hydrogen chloride, which serves simultaneously both to hydrogenate and to chlorinate the polymer.

Various aspects of the present invention may be illustrated by the following specific examples, which, however, are given by way of demonstration rather than of limitation:

*Example I.—Cyclic polymerization*

7412 gm. conjugated methylpentadiene and 5810 gm. SO$_2$ were charged to a steam-heated autoclave. The autoclave was heated at 100° C.–130° C. for 30 minutes and then vented. The reaction product consisted of two layers. The upper layer, the diolefin polymer, amounted to approximately an 80% conversion based on the methylpentadiene charged. This methylpentadiene polymer was separated and refluxed to crack out any 2,4-dimethyl-3-sulfolene dissolved in the polymer and also to remove any SO$_2$ dissolved in the polymer. The polymer was then washed with a 10% NaOH solution at 100° C. to remove the last traces of SO$_2$ followed by two water washes to remove the NaOH and NaHSO$_3$ present. The water was then distilled off from the polymer.

The 2,4-dimethyl-3-sulfolene formed during such reaction may be converted to diolefin polymer in the following manner:

904 gm. 2,4-dimethyl-3-sulfolene was charged to a flask attached to a reflux condenser. The flask was heated at 90° C.–110° C. until cracking had ceased (3 hours) and then the kettle was heated until the temperature rose to 191° C. (7 hours). There was recovered 494 gms. diolefin polymer representing a 97.4% conversion. This polymer was freed from the free SO$_2$ in the same manner as described above.

*Example II.—Linear homopolymerization*

A mixture of 19 gm. of 2-methyl-1,3-pentadiene and 4-methyl-1,3-pentadiene was dissolved in 25 cc. of a mixture of isomeric pentanes and cooled to −100° C. There was then added dropwise with stirring a solution of 0.38 gm. of stannic chloride in a small amount of ethyl chloride. The mixture was promptly cooled to about −190° C. and stored for 2 hours. The conversion to polymer was approximately 100%. The mixture was poured into a large volume of acetone, whereby the polymer precipitated. It was separated by decantation, water-washed and dried under vacuum at room temperature. The polymer was light in color, had a molecular weight of 89,000 as determined by viscosity measurements and was extremely tough.

*Example III.—Linear homopolymerization*

A mixture of 360 gm. of 2-methyl-1,3-pentadiene and 4-methyl-1,3-pentadiene was dissolved in 1250 cc. n-butane and cooled to −77° C. with solid CO$_2$. There was then sprayed in with stirring a solution of 1.8 gm. aluminum chloride in a small amount of ethyl chloride. The mixture was stored for two hours and then worked up as described in Example II. The conversion to polymer was approximately 60%. The polymer was a light colored semi-solid which had a molecular weight of 25,000 as determined by viscosity measurements.

*Example IV.—Linear homopolymerization*

A mixture of 400 gm. of methylpentadienes was dissolved in 1500 cc. methyl chloride. The temperature of the mixture was −21° C. There was then sprayed in with stirring a solution of 2 gm. aluminum chloride in a small amount of ethyl chloride. The reaction mixture was stored for two hours and then worked up as described in Example II. The conversion to polymer was approximately 99%. The polymer was a light colored, very soft solid which had a molecular weight of 51,000 as determined by viscosity measurements.

*Example V.—Linear homopolymerization*

A mixture of 288 gm. of methylpentadienes was dissolved in 800 cc. ethylene. The temperature of the mixture was −100° C. A small amount of BF$_3$ together with ethyl chloride was injected with an aspirator. The reaction mixture was stored for two hours and then worked up as described in Example II.

The conversion to polymer was approximately 82%. The polymer was a clear water-white semi-solid which had a molecular weight of 33,000 as determined by viscosity measurements.

*Example VI.—Linear copolymerization*

In each case 100 parts by weight of the mixture of conjugated methyl pentadienes with butadiene or isoprene, together with diazoaminobenzene, 1 part, as catalyst, was emulsified in water, 180 parts, containing a fine neutral white soap, 5.1 parts, as an emulsifying agent and an organic dispensary agent as protective colloid. The emulsion was maintained at 90° C. for the indicated period, following which the emulsion was broken by the addition of an electrolyte. The precipitated co-polymer was washed and dried in the usual manner.

| Example No. | A | B | C | D | E | F | G | H | J |
|---|---|---|---|---|---|---|---|---|---|
| Butadiene, parts | 5 | 10 | 10 | 20 | --- | --- | --- | --- | --- |
| Isoprene, parts | --- | --- | --- | --- | 5 | 10 | 10 | 20 | 20 |
| MPD,[1] parts | 95 | 90 | 90 | 80 | 95 | 90 | 90 | 80 | 80 |
| Poly. time, hrs | 16 | 16 | 11 | 11 | 16 | 16 | 11 | 11 | 16 |
| Yield, per cent | 82 | 95 | 79 | 86 | 85 | 90 | 79 | 80 | 95 |

[1] Mixture of about 85% of 2-methyl-1,3-pentadiene with about 15% of 4-methyl-1,3-pentadiene.

*Example VII.—Copolymerization with isobutylene*

A mixture of 288 gm. of conjugated methylpentadienes was dissolved in a mixture of 288 gm. isobutylene and 1600 cc. ethylene. The temperature of the mixture was −100° C. There was then added dropwise with stirring a solution of 5.77 gm. aluminum chloride in 80 gm. ethyl chloride. The reaction mixture was stored for one hour and then worked up as described in Example II. The conversion to polymer was approximately 99%. The polymer was a clear semi-solid which had a molecular weight of 18,000 as determined by viscosity measurements.

*Example VIII.—Copolymerization with alpha methylstyrene*

A mixture of 360 gm. of conjugated methyl pentadienes was dissolved in a mixture of 40 gm. alpha methylstyrene and 1750 cc. propane. The reaction mixture was cooled to −75° C. There was then sprayed in with stirring 4 gm. aluminum chloride dissolved in a small amount of ethyl chloride. The reaction mixture was stored for two hours and then worked up as described in Example II. The conversion to polymer was approximately 92%. The polymer was a nearly colorless stiff semi-solid which had a molecular weight of 42,000 as determined by viscosity measurements.

*Example IX.—Chlorination*

To a stirred solution of 200 gm. cyclic methylpentadiene polymer in 500 gm. CCl$_4$, 23 gm. of chlorine was bubbled while the temperature was held between 15° C.–30° C. for about 0.5 hour. Upon completion the CCl₄ was removed from the reaction mixture by flash distillation. There was recovered 223 gm. of product representing a 100% conversion. The product contained 10.3% chlorine and was a viscous liquid. Upon removal from the reaction chamber the chlorinated polymer was dark-colored but upon the addition of a small amount (less than 1%) of saturated alkyl amines containing about 16–18 carbon atoms it immediately became a permanent light yellow color.

The linear methylpentadiene polymers or copolymers may be chlorinated in the same manner.

When the chlorinated polymers are employed for their extreme pressure properties in amounts of between about 0.1% to 20% w. based on added halogen is generally adequate.

The nature of the lubricant in which the present additives are incorporated will, of course, depend upon the particular use to which it is to be put. For lubricating heavily loaded gears or in other application in which high film strength is required, a more viscous oil or grease will be applied than would be used to lubricate a crankcase. Likewise, the lubricant most commonly used is refined mineral oil or petroleum; however, this may be replaced in whole or in part by vegetable, animal or fish oils such as cottonseed oil, maize oil, olive oil, palm oil, castor oil, soya bean oil, jojoba oil, lard, tallow, degras oil, sperm oil, whale oil, etc., as well as by so-called synthetic lubricants such as polymerized olefins, esters, ethers, etc.

When the chlorinated high molecular weight polymers are employed in organic compositions such as lubricating oil, in addition to the beneficial properties conferred by chlorine, the polymer acts as a bodying agent for the organic media. Thus, small amounts, generally less than 10% based on the weight of the oil, of such polymers having a molecular weight of upwards of about 50,000 have a notable effect on the viscosity index of an oil. The term "viscosity index" ("V. I.") refers to the comparative viscosity-temperature relationship as defined by Dean and Davis in Chem. and Met. Eng., 36, 616 (1929).

The present additives may be incorporated advantageously in extreme pressure lubricants, cutting oils, rolling oils, wire drawing lubricants, greases, hypoid gear lubricants, and, especially these polymers, may be employed in lubricants for bearings, in particular modern alloy bearings such as cadmium-silver, cadmium-nickel, copper-lead, "high lead" alloys as well as Babbitt metal, and the like. They may also be used to impart anti-wear and/or anti-oxidant properties to lubricants not necessarily subject to high pressure. In addition, by reason of their anti-oxidant properties these polymers may be incorporated advantageously in organic substances not intended for use as lubricants at all, such as gasoline, kerosene, spray oil, medicinal oil, transformer or electrical insulating oil, cleaning fluid, synthetic or natural rubber, resins, waxes, Diesel fuel, photographic developers, added to rubber cements, etc.

Particular reference may be made to the inclusion of the herein described anti-oxidants as additives for coating materials such as asphalt, resins, oils, waxes, varnish, insulating or moisture-protective substances such as oiled or "waxed" paper, etc. Such plastic or semi-plastic vehicles may also contain, for example, anti-rusting agents and be applied to metal surfaces to provide a corrosion-resistant coating. Also such oxidation inhibited adhesion coatings may be applied to wood, paper, cardboard, felt, stone, laminated glass, fabric, concrete, plastic compositions, etc., by such methods as roller coating, dipping, brushing, spraying and the like.

The present chlorinated polymers may also be advantageously used in connection with other additives in lubricating media, for example, detergents formed from the oil-soluble salts of various bases with detergent forming acids.

Such bases include metallic as well as organic bases. Metallic bases include those of the alkali metal, as well as Cu, Mg, Ca, Sr, Ba, Zn, Cd, Al, Sn, Pb, Cr, Mn, Fe, Ni, Co, etc. Organic bases include various nitrogen bases as primary, secondary, tertiary and quaternary amines.

Examples of detergent forming acids are the various fatty acids of, say, 10 to 30 carbon atoms, wool fat acids, paraffin wax acids (produced by oxidation of paraffin wax), chlorinated fatty acids, aromatic carboxylic acids including aryl fatty acids, aryl hydroxy fatty acids, paraffin wax benzoic acids, various alkyl salicyclic acids, phthalic acid mono esters, aromatic keto acids, aromatic ether acids; diphenols as di-(alkyl phenol) sulfides and disulfides, methylene bis alkylphenols; sulfonic acids such as may be produced by treatment of alkyl aromatic hydrocarbons or high boiling petroleum oils with sulfuric acid; sulfuric acid mono esters; phosphoric acid mono and di-esters, including the corresponding thiophosphoric acids; phosphonic and arsonic acids, etc.

Non-metallic detergents include compounds such as the phosphatides (e. g. lecithin), certain fatty oils as rapeseed oils, voltolized fatty or mineral oils.

Other detergents are the alkali earth phosphate di-esters, including the thiophosphate di-esters; the alkali earth diphenolates, specifically the calcium and barium salts of diphenol mono and poly sulfides; etc.

Particularly effective detergents are the polyvalent metal salts of the resinous condensation products of low molecular weight aldehydes (such as HCHO, CH₃CHO, etc.) with alkylated aryl hydroxy products (such as alkyl phenol, alkyl naphthol, etc.). They may be typified by the calcium salt of the reaction product of formaldehyde and iso-octyl phenol

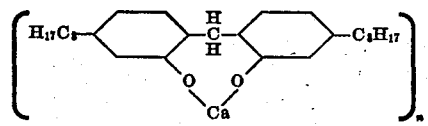

wherein $n$ is a small integer such as 2, 3 or 4 or the product is a mixture of such polymers.

The present additives may also be used in association with other anti-oxidants, for example, alkyl phenols such as 2,4,6-trimethylphenol, pentamethylphenol, 2,4-dimethyl-6-tertiary-butylphenol, 2,4-dimethyl-6-octyl-phenol, 2,6-ditertiary-butyl-4-methylphenol, 2,4,6-tritertiary-butylphenol, etc.; amino phenols as benzyl amino phenols; amines such as dibutylphenylenediamine, diphenylamine, phenyl-alpha-naphthylamine, phenyl-beta-naphthylamine, dinaphthyl amines; etc.

Other sulfur-containing anti-oxidants may also be present. These should have a minimum of about 10 carbon atoms. Such anti-oxidant sulfur may be in the form of mercaptans, as in decyl mercaptans, dodecyl mercaptans, cetyl mercaptans, oleyl mercaptans, stearyl mercaptans, butyl or other higher alkyl thiophenes; thionaphthols, alkyl thionaphthols, etc.; or of polysulfides $(R(SS)_xR'$ as in diamyl disulfide and higher dialkyl disulfides, e. g. diphenyl disulfides, dibenzyl disulfide, dinaphthyl disulfides, wax polysulfide formed by reaction of polychlorinated wax sodium polysulfide, etc.); or of sulfur compounds formed by attaching sulfur to an olefinic double bond (as by reacting sulfur with olefins at temperature of about 150° C. to 300° C.) which compounds are believed to contain the structure

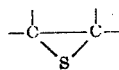

(sulfur in epithio linkage).

Other corrosion inhibitors may also be present such as dicarboxylic acids of 16 and more carbon atoms, alkali metal and alkali earth salts of sulfonic acids and fatty acids, mono carboxylic acids containing a minimum of about 12 carbon atoms and having a nitro, nitrose, nitrile, mercapto, or aryl sulfonyl group attached to the alpha or beta carbon atom, etc.

Likewise, other additives may be present in a lubricating oil or grease such as blooming agents, anti-foaming agents, other viscosity index improvers, pour point depressants, etc.

This application is a division of our copending application Serial No. 555,892, filed September 26, 1944, said application having matured into U. S. Patent 2,439,610 on April 13, 1948.

We claim as our invention:

1. A lubricating composition comprising a major amount of a mineral lubricating oil and 0.1–20% by weight of a chlorinated cyclic polymer, said polymer having been prepared by heating methyl 1,3-pentadienes and sulfur dioxide at a temperature of 100–130° C. for 30 minutes, removing the sulfolene so formed to leave a mixture of methylpentadiene cyclic polymers predominantly having 7–8 methylpentadiene units, and subsequently treating said polymer with chlorine at a temperature of 15–30° C. to form a chlorinated mixture of polymers having a chlorine content of 10.3% by weight.

2. A lubricating composition comprising a major amount of a mineral lubricating oil and 0.1–20% by weight of a chlorinated cyclic polymer, said polymer having been prepared by heating methyl 1,3-pentadienes and sulfur dioxide at a temperature of 100–130° C. for 30–60 minutes, removing the sulfolene so formed to leave a mixture of methylpentadiene cyclic polymers predominantly having 4–10 methylpentadiene units and boiling above 250° C., and subsequently treating said polymer with chlorine at a temperature below 100° C. to form a chlorinated mixture of polymers having a chlorine content of 10–20% by weight of said polymer.

3. A lubricating composition comprising a major amount of a mineral lubricating oil and 0.1–20% by weight of a chlorinated cyclic polymer, said polymer having been prepared by heating methyl 1,3-pentadienes and sulfur dioxide at a temperature of 100–130° C. for 30–60 minutes, removing the sulfolene so formed to leave a mixture of methylpentadiene cyclic polymers predominantly having 7–8 methylpentadiene units, and subsequently treating said polymer with chlorine at a temperature of 15–30° C. to form a chlorinated mixture of polymers having a chlorine content of about 10% by weight.

4. A lubricating composition comprising a major amount of a mineral lubricating oil and 0.1–20% by weight of a chlorinated cyclic polymer, said polymer having been prepared by heating methyl 1,3-pentadienes and sulfur dioxide at a temperature of 100–130° C. for 30–60 minutes, removing the sulfolene so formed to leave a mixture of methylpentadiene cyclic polymers predominantly having 7–8 methylpentadiene units, and subsequently treating said polymer with chlorine at a temperature of 15–30° C. to form a chlorinated mixture of polymers having a chlorine content of 10–20% by weight.

5. A lubricating composition comprising a major amount of a mineral lubricating oil and 0.1–20% by weight of a chlorinated cyclic polymer, said polymer having been prepared by heating methyl 1,3-pentadienes and sulfur dioxide at a temperature of 100–130° C. for 30–60 minutes, removing the sulfolene so formed to leave a mixture of methylpentadiene cyclic polymers predominantly having 4–10 methylpentadiene units and boiling above 250° C., and subsequently treating said polymer with chlorine at a temperature of 15–30° C. to form a chlorinated mixture of polymers having a chlorine content of 10–20% by weight of said polymer.

RUPERT C. MORRIS.
JOHN L. VAN WINKLE.
ALVA V. SNIDER.

REFERENCES CITED

The following references are of record in the file of this patent:

UNITED STATES PATENTS

| Number | Name | Date |
|---|---|---|
| 2,142,980 | Huijser | Jan. 3, 1939 |
| 2,181,144 | Morway | Nov. 28, 1939 |
| 2,213,331 | Arveson | Sept. 3, 1940 |
| 2,225,318 | Morway | Dec. 17, 1940 |
| 2,274,305 | Remy | Feb. 24, 1942 |